Jan. 23, 1940.  B. J. CRAIG  2,187,935
VEHICLE DOOR CONTROLLING MECHANISM

Filed May 7, 1938   5 Sheets-Sheet 1

INVENTOR.
B. J. Craig

Jan. 23, 1940.  B. J. CRAIG  2,187,935

VEHICLE DOOR CONTROLLING MECHANISM

Filed May 7, 1938  5 Sheets-Sheet 2

INVENTOR.
B. J. Craig

Jan. 23, 1940.                B. J. CRAIG                 2,187,935
                    VEHICLE DOOR CONTROLLING MECHANISM
                    Filed May 7, 1938        5 Sheets-Sheet 5

INVENTOR.

Patented Jan. 23, 1940

2,187,935

UNITED STATES PATENT OFFICE 2,187,935

VEHICLE DOOR CONTROLLING MECHANISM

Burnie J. Craig, Los Angeles County, Calif.

Application May 7, 1938, Serial No. 206,536

25 Claims. (Cl. 180—82)

This invention relates to door latching, closing and controlling mechanism which is particularly, although not exclusively, adapted for use in connection with the doors of automotive vehicles, a general object being to provide a mechanism including cooperating parts adapted to be mounted upon the door and/or frame and/or body pillar with the parts acting in improved and effective manner so that the door may be closed quietly and be opened easily.

A more specific object of the invention is to provide a door control mechanism for an automotive vehicle which enables the passenger to settle himself comfortably and then easily swing the door by unimpeded movement to a partially closed position whereupon the door will be automatically moved, quickly and quietly, to fully closed position.

Efforts heretofore made to provide closing means for automotive vehicle doors have been found unsuccessful due to structural and operating conditions present in such doors which are not present in doors on stationary objects such as buildings.

Automotive vehicle doors, due to manufacturing tolerances permitted, are somewhat loosely mounted and are held tightly latched against resilient bumpers to prevent rattling. This requires that the door be moved to latching position against a strong force exerted by the bumpers which tend to open the door and since the bumpers are compressed only momentarily, the latch bolt must be quickly projected otherwise the bumpers force the door open before the bolt is secure.

This requires the use of a strong spring for urging the bolt to latching position and as a result considerable force is required to cause the bolt to be retracted as it passes over the strike in the closing operation and again to retract the bolt by operation of the handle in opening the door. If a weak spring is employed for the bolt the latter may not move to latching position during the interval while the bumpers are compressed and also with a light spring accidental opening, or opening by children, becomes a hazard. It has also been found objectionable that the latch bolt frequently is not fully projected and as a result the door handle sags and consequently the roll back may not function smoothly and various means have been proposed seeking to overcome these objections.

Automatic closers for the doors of automotive vehicles which are strong enough to compress the bumpers require mechanism strong enough to accelerate the door through a large angle to build up speed in the door or require the use of an auxiliary spring which becomes effective near the end of the closing movement of the door. This requirement usually necessitates construction of a type of closer which starts the closing action as soon as the door is released and before the passenger is settled and before his hands are out of the way, which is of course objectionable. The use of manually controlled means to prevent premature closing has been suggested but not widely used.

It is a further object of the invention to provide novel control means for the doors of automotive vehicles which overcomes or minimizes the objections noted and which in addition has other advantages.

A more specific object of the invention is to provide a door construction for an automotive vehicle including a latch wherein in latching the bolt is first engaged after which the bumper is placed under full compression.

Another object of the invention is to provide a novel closing means for the door of an automotive vehicle.

A further object of the invention is to provide a novel latching means for the door of an automotive vehicle.

Another object of the invention is to provide a novel combined check and latching means for the door of an automotive vehicle.

An additional object of the invention is to provide a novel combined check, closing and latching means for the door of an automotive vehicle.

A further object of the invention is to provide a novel finger tip control for the latch of the door of an automotive vehicle.

An additional object of the invention is to provide a novel bumper construction for an automotive vehicle door.

Another object of the invention is to provide a novel, speed controlled, latching means for the door of an automotive vehicle.

Other objects and the advantages of my invention will be apparent from the following description taken in connection with the accompanying drawings, wherein.

Referring to the drawings by reference characters the invention is shown as embodied in a door control mechanism which is indicated generally at 10 and is shown as mounted upon an automotive vehicle indicated at 11.

Figure 1:
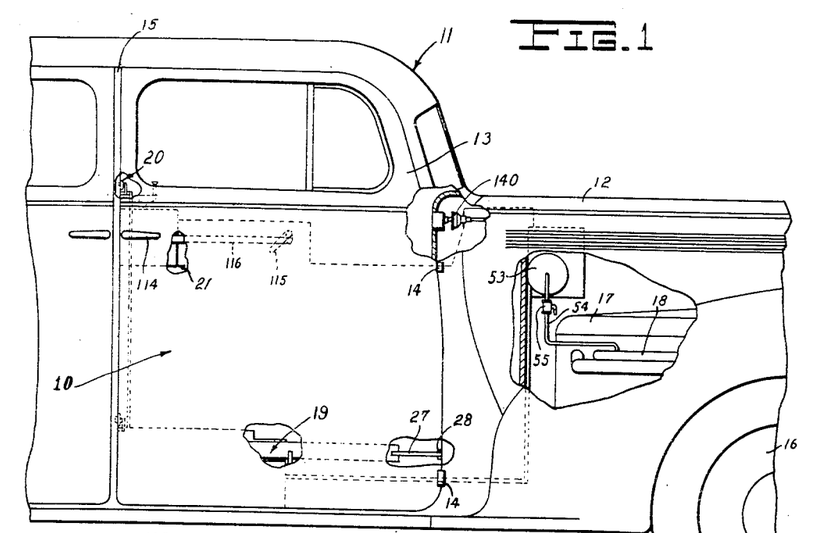
Fig. 1 is a fragmentary side elevation of an automotive vehicle showing the invention applied thereto.

The vehicle shown has a body 12 of the sedan type, and includes doors 13 pivotally mounted on hinges 14, secured to the door frame, to swing towards and from body pillars 15. The vehicle is supported on wheels 16 and includes an engine 17 shown as having an intake manifold 18. The door control mechanism 10 as shown includes door operating or control devices 19, bumper devices 20 and latch devices 21.

The door operating or control devices 19 each includes a traction member 22 mounted to slide between tongues 23 on a supporting plate 24 which as shown includes a bottom flange 25 and an end flange 26 which are secured to the bottom and side respectively of the door. The traction member is pivoted to a link 27 (see Fig. 1) which in turn is pivoted to a bracket 28 shown as secured to the door frame so that as the door opens and closes the traction member slides back and forth on the door.

The traction member 22 is provided with an elongated slot 29 to receive a roller 30 mounted on a pin 31 (see Fig. 14) secured to the plate 24. The roller 30 preferably has a thickness substantially equal to that of the traction member and the pin 31 projects beyond the roller where it is enlarged to pivotally support a lever 32 one end 33 of which includes teeth 34 which are engaged by a dog 35 mounted on a pin 36 which is secured to a tongue 37 bent up from the plate 24. A trip 38 is mounted on the pin 36 and the construction is such that when the trip is moved in one direction by engagement with a pin 39 on the traction member 22 a shoulder 40 on the trip moves the dog 35 from the engaged tooth 34 and on a return movement of the traction member the pin 39 rocks the trip 38 without shifting the dog. A spring 41 normally urges both the dog and trip to normal position.

A spring 42 shown as mounted on the pin 31 engages and urges the lever 32 in an anti-clockwise direction. The lever 32 as shown has a roller 43 (see Fig. 5) thereon which is fitted in a slot 44 in one end of an arm 45 which is pivoted on a pin 46 on the plate 24 and which at its other end has a slot 47 which receives a roller 48 on a rod 49 on a piston 50 arranged in a vacuum cylinder 51 which is made of suitable size and is shown as connected by a pipe 52 to a tank 53 (Fig. 1) which communicates through a pipe 54 with the intake manifold 17.

The pipe 54 includes a three-way valve 55 which allows flow through the pipe 52 or which opens the pipe 52 to the atmosphere. A rod 56 along which the piston slides includes a valve aperture 56a which intersects the pipe 52 when the rod is in one position and which closes communication through the pipe 52 when in another position. When a shoulder 57 at the end of the rod 56 engages the outer face of the piston 50 it shifts the rod and opens communication through the valve aperture 56a. The construction is such that when the valve 55 is in one position and the door has been closed (in a manner to be later described) the arm 45 during the door closing is rocked by movement of the lever 32 so that the piston 50 will engage the shoulder 57 to move the rod 56 thus opening the valve aperture 56a and causing the partial vacuum in the tank 53 to move the piston 50 inwardly thus cocking or energizing the spring 42. At the time the dog 35 enters the last tooth 34 on the lever 32 the valve 56a is closed by engagement of the piston 50 with a shoulder 59 on the rod 56.

When the valve 55 is turned to its second position the pipe 52 is open to the atmosphere so that the cylinder 51 is not effective to cock the spring.

The end of the lever 32 remote from the teeth 34 is pivoted as at 60 to a second lever 61 which includes an elongated slot 62 having an offset portion 63 forming a shoulder 64. A roller 65 mounted on a pin 66 secured on the traction member 22 is disposed in the slot 62 and in the position shown in Fig. 8 engages the shoulder 64. The second lever 61 includes an end 67 and a shoulder 68.

Figures 4, 5, 11, 12, 13, 14:
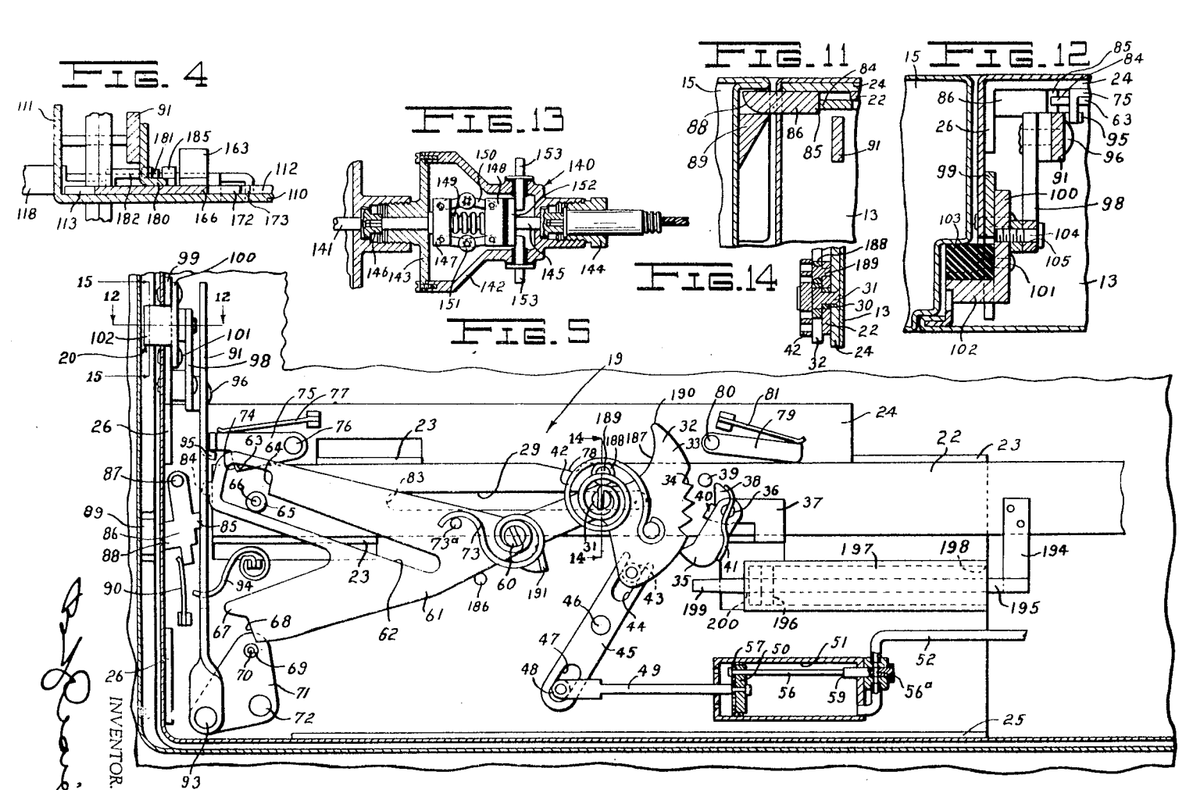
Fig. 4 is a section taken on line 4—4 of Fig. 2.
Fig. 5 is a fragmentary elevation showing the control member.
Fig. 11 is a section taken on line 11—11 of Fig. 8.
Fig. 12 is a section taken on line 12—12 of Fig. 5.
Fig. 13 is a central sectional view showing the governor.
Fig. 14 is a section taken on line 14—14 of Fig. 5.

The shoulder 68, when the parts are in the position shown in Fig. 5, is spaced a slight distance above from a roller 69 mounted on a pin 70 which is disposed on a rocker arm 71 pivoted as at 72 to the plate 24. A spring 73 which is shown as mounted on the pivot 60 engages a pin 73a to urge the lever 61 downwardly.

As shown the traction member 22 is provided with a notch 74 which is adapted to receive a dog 75 pivoted as at 76 to the plate 24 and normally urged downwardly by a spring 77. The notch 74 and dog 75, when employed, are so disposed that the dog engages the notch when the door is closed to thus provide a safety catch for the door.

In order to releasably hold the door in open position the traction member 22 is shown as provided with a notch 78 which, when the door approaches its fully open position, is engaged by a dog 79 pivoted as at 80 to the plate 24. A spring 81 normally urges the dog 79 downwardly. When the dog 79 is employed and the door is opened the dog 79 engages in the notch 78 to hold the door against closing until sufficient pressure is applied to the door to cause the spring 81 to release the dog.

The length of the slot 29 is shown as such that the roller 30 engages the end 83 of the slot when the door is fully opened and thus serves as a door check. This checking action, when employed, is resilient since when the roller 30 engages the end 83 of the slot the lever 61 rocks the lever 32 about its pivot thus further compressing the spring 42. The cushioning effect thus produced, however, is of such a character that it does not cause the door to suddenly fly back with consequent danger.

In order to assist in the closing operation the lever 61 may include a projecting end 84 which (Fig. 8) engages a portion 85 of a cam member 86 which is pivoted as at 87 to the plate 24 and which includes a cam face 88 (see Fig. 11) adapted to engage a strike 89 to thus cam the door to fully closed position, as will be later described. A spring 90 normally urges the arm 86 away from the strike 89.

A control member 91 extends along the inner face of the outer edge of the door and at its lower end engages a pin 93 on the rocker arm 71 previously described. A spring 94 on the plate 24 normally urges the control member 91 upwardly. The control member 91 includes a tongue 95 which engages the end of the dog 75 so that when the control member moves upwardly the dog 75 is lifted from the notch 74. The spring 94 is, of course, stronger than the spring 77.

Figure 10:
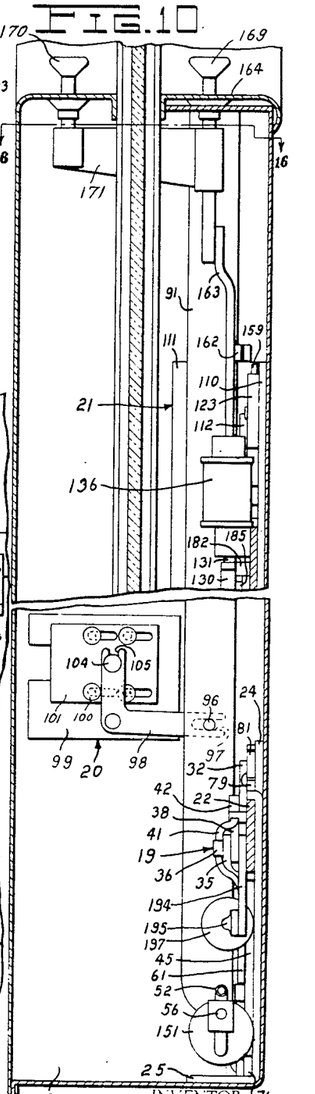
Fig. 10 is a section through the door showing the position assumed when the door is fully closed.

The control member 91 has a plurality of pins 96 thereon which engage in slots 97 (see Fig. 10) in pivoted bell crank members 98 for operating each bumper device 20 previously mentioned.

Figures 7, 15:
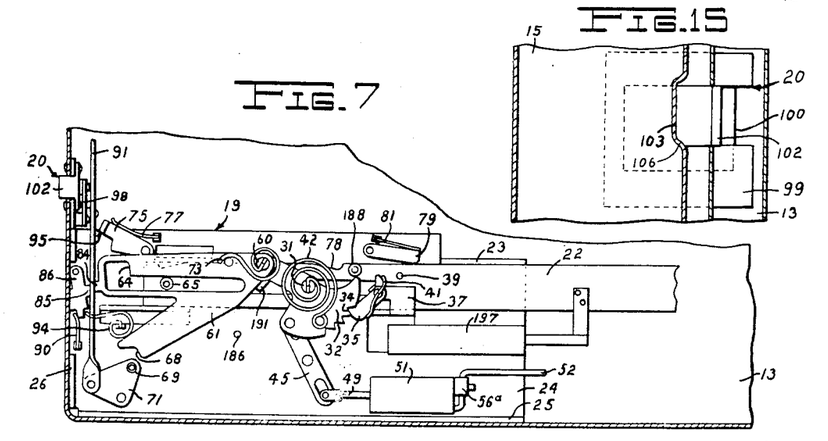
Fig. 7 is an elevation, with parts in section, showing the door control device with the spring energized and the door being opened.
Fig. 15 is a fragmentary section taken on line 15—15 of Fig. 5.

The bumper devices 20 are spaced apart on the door and as shown are alike each device including an attaching plate 99 which is suitably secured to the outer end of the door. Each plate 99 supports a plurality of pins 100 on which a slide 101 is mounted. This slide 101 includes (see Figs. 12 and 15) a projecting bumper portion 102 which may include a resilient face 103. The slide 101 includes a projecting pin 104 which engages in a slot 105 in the bell crank 98.

The result of the described construction is that when the control member 91 is moved downwardly the slide members 101 are shifted thus urging the bumpers towards the pillar 15. The pillar 15 may include a surface 106 (see Fig. 15) which may be of a contour to form a cam face which when engaged by the bumper face 103 tends to urge the door upwardly.

The door control described may be used with a standard latch mechanism although it is preferably employed with the latch device 21 which will now be described.

The latch device 21 includes a plate 110 having a flange 111 suitably secured upon the door. The sliding latch member indicated at 112 is controlled by a roll back 113 which is actuated by the outside door handle 114. A remote control handle 115 shifts an actuator 116 which when the remote handle is turned in one direction acts to draw the latch member to releasing position and which (by a construction not shown) when the handle is turned in an opposite direction pushes the actuator 116 so that the latter serves to latch the roll back to prevent shifting of the latch member. A strike 117 is engaged by the bolt end 118 of the latch member 112. The portion of the latch device thus far described is old and forms no part of the present invention.

A dog 119 is pivoted at 120 to the plate 110 and is urged by a spring 121 to engage a tongue 122 on the control member 91 to hold the control member with the bumpers engaged.

In the present invention, as shown, a spring 123 normally urges the latch member against a silencing bumper 124 which is held against the flange 111 by a tongue 126. The spring 123 is preferably a light spring which enables a door bolt to be retracted easily and quickly.

The use of a light, easily controlled spring to urge the bolt member to engaged position if left unguarded might produce a condition in certain circumstances which while the vehicle was running would permit the door to open accidentally or might allow it to be opened by curious persons, such as children, pressing the finger tip control to be later described.

To overcome this possibility I provide a novel speed control for the latch member. As shown the construction includes a spring 130 on the plate 110 and which is disposed adjacent to the latch member 112 in the path of movement of a retractable pin 131. This pin 131 is normally in such a position that should the latch member be shifted in opening the door the pin 131 would engage the spring 130 thus requiring that both springs 123 and 130 be tensioned in opening the door.

Figure 2:
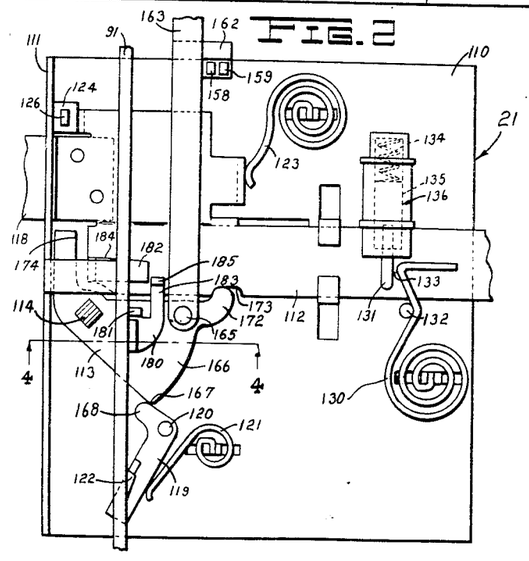
Fig. 2 is a side elevation of the latch.
Figure 3:
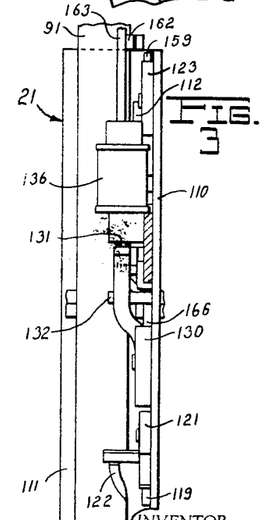
Fig. 3 is an end view of the latch.

The pin 131 is normally out of direct engagement with the spring 130, the latter engaging a stop 132 on the plate 110 so that the spring and pin are spaced apart, as at 133. The pin 131 is normally free to fall by gravity to a position so that it may engage the spring 130 and is also normally urged to the position shown in Fig. 2 by a spring 134. The pin 131 is shown as continuous with the core 135 of a solenoid 136 which is mounted on the latch member 112, the construction being such that when the solenoid is energized the pin 131 will be moved from its normal position to a location out of the path of movement of the spring 130.

It will be noted that when the solenoid 136 is energized only the spring 123 need be flexed to slide the latch member.

In order to control the solenoid and thus vary the tension required to retract the latch member a speed responsive device is employed. This device is shown as a governor 140 (see Fig. 13) connected to the speedometer drive shaft 141. It will be understood that the speedometer shaft and the governor are merely illustrative of one device responsive to the speed of the vehicle or its driving means.

The governor 140, as shown, includes a body 142 having a closure 143 thereon at one end and having a plug closure 144 at the other end. The body includes a shaft 145 which rotates therein and which at the ends includes couplings 146 of any desired type, by means of which the shaft 145 is coupled to the speedometer shaft 141.

The shaft 145 includes a collar 147 fixed thereon and a second collar 148 slidable thereon, the collars being urged apart by a spring 149. The collars are connected by pivoted arms 150 which have weights 151 thereon and the construction is such that when the shaft 145 revolves the weights 151 move outwardly thus compressing the spring and shifting the movable collar 148. The tension of the spring 149 determines the shifting of the movable collar so that the latter is moved from its extreme position when the speedometer shaft rotates at a predetermined speed. The collar 148 has an insulating portion on which a metal circuit closer 152 is mounted. The circuit closer 152 when the spring urges it to operative position engages contact pins 153 in the body 142.

Figure 21:
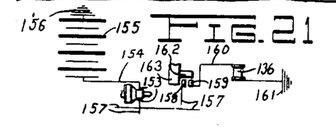
Fig. 21 is a wiring diagram.

One of the pins 153 is connected by a lead 154 (see Fig. 21) with a battery 155 which is grounded as at 156. The other pin 153 is connected by a lead 157 with a contact 158 on each door. Since all the doors are preferably alike but one will be described. Each contact 158 is arranged adjacent to a second contact 159 which is connected by a lead 160 with the solenoid 136 which is grounded at 161. A circuit closer 162 adapted to bridge the contacts 158 and 159 is mounted on a finger tip control member 163 which, as shown, passes through an aperture in the garnish molding 164 inside of the window.

The finger tip control member 163 at its lower end pivotally engages at 165 a projection 166 on the roll back 113. The projection 166 includes a portion 167 which engages an angularly disposed portion 168 of the dog 119 and the construction is such that when a push button 169 at the upper end of the finger tip control member 163 is depressed it rocks the dog 119 against the tension of the spring 121 to thereby release the control member 91.

Figures 8, 16:
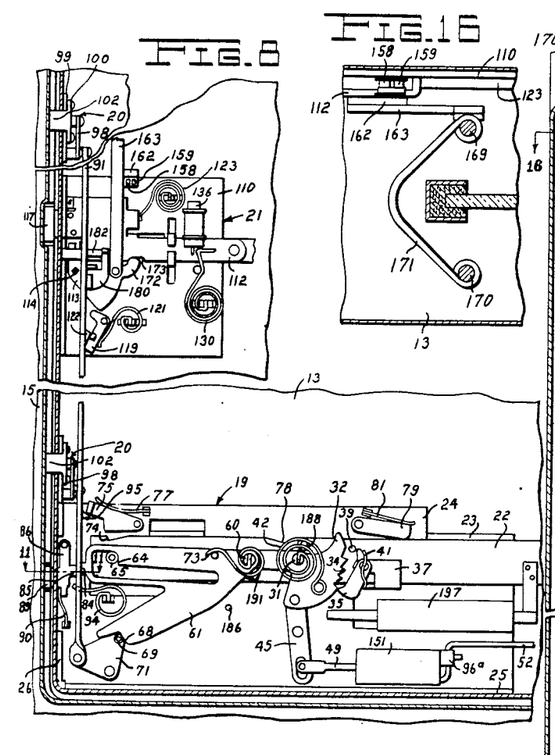
Fig. 8 is an elevation, with parts in section, after the first toggle action is completed.
Fig. 16 is a sectional view taken on line 16—16 of Fig. 10.

The finger tip control member 163, as shown, may be operated by a push button 170 disposed on the outside of the door and which is connected to the control member 163 by a U-shaped member 171 which extends around the end of the window as shown in Fig. 16. The dog 119 normally holds the finger tip control member 163 in the raised position shown in Fig. 2.

The present construction thus provides a finger tip door control which operates independent of the usual door handles 114 and 115 and which operates without drain on the battery since no current flows from the battery except during the interval when the bolt is being retracted. Since there is normally no pressure on the pin 131 except that of the spring 134 the pin 131 can be moved by a small solenoid. When the vehicle is in motion the spring 130 remains coupled with the latch member. In this condition it is necessary to actuate the door handles with the usual force to open the door.

From the foregoing description it will be apparent that when any one of the members 114, 169 or 170 is operated, when the door is latched, that the first result will be that the dog 119 will be released thus freeing the control member 91 whereupon the bumpers 20 will be released and the friction between the bolt 118 and its strike will be decreased. This release of bumper pressure occurs before the latch member starts its movement so that in moving the latch member only the spring pressure must be overcome.

The roll back portion 166 includes a tongue 172 which fits in a notch 173 in the latch member 112 and which when the latch member is shifted by the remote control 115 causes the roll back to be shifted thus freeing the dog 119. When the remote control handle 115 is moved it first pulls the latch member while still fully engaged with its strike until the dog 119 is released. This initial movement of the inside remote control handle 115 when the vehicle is in motion requires much force so that accidents are avoided.

When the remote control 115 is operated with the governor in condition to close the circuit to the contacts 158 (as when the vehicle is at rest) the closer 162 will be pulled down as the roll back is moved to thereby bridge the contacts 158 and 159 and thus energize the solenoid and withdraw the pin 131. Under this condition a light force on the remote control handle will actuate the latch member 112 to door opening position since the pin 131 is withdrawn from the path of the spring 130.

It will be understood that full movement of any of the members 114, 115, 169 or 170 will move the portion 174 of the roll back causing it to push the latch member 112 and its bolt end 118 to disengaged position.

When the vehicle is at rest or is moving so slowly that the circuit is closed through the governor 140 the circuit is closed (as a preliminary to withdrawal of the latch member) through the contacts 158 and 159, the pin 131 is withdrawn whereby the spring 130 is ineffective to retard the action of the roll back, and since the bumpers have been released the light spring 123 only need to be overcome before the door is opened so that a finger tip pressure on the members 169 or 170 is all that need be employed when it is safe to open the door. It will also be understood that when the vehicle is at rest or is moving slowly the handles 114 and 115 may if desired be employed to open the door and that under this condition these handles will be movable by finger pressure.

When it is dangerous for the door to be opened the opening action requires that the springs 123 and 130 both be tensioned and also that the friction between the bolt and its strike be overcome. This opening action can be made to require so much force on the remote control handle as to almost prevent opening the door while the vehicle is in motion, thus the objection to riding in a vehicle with the doors locked is overcome. The difficulty in moving the usual latch member to open the door is a source of annoyance to many and the present invention also overcomes this annoyance without sacrifice of safety.

Figures 6, 17, 18, 19, 20:
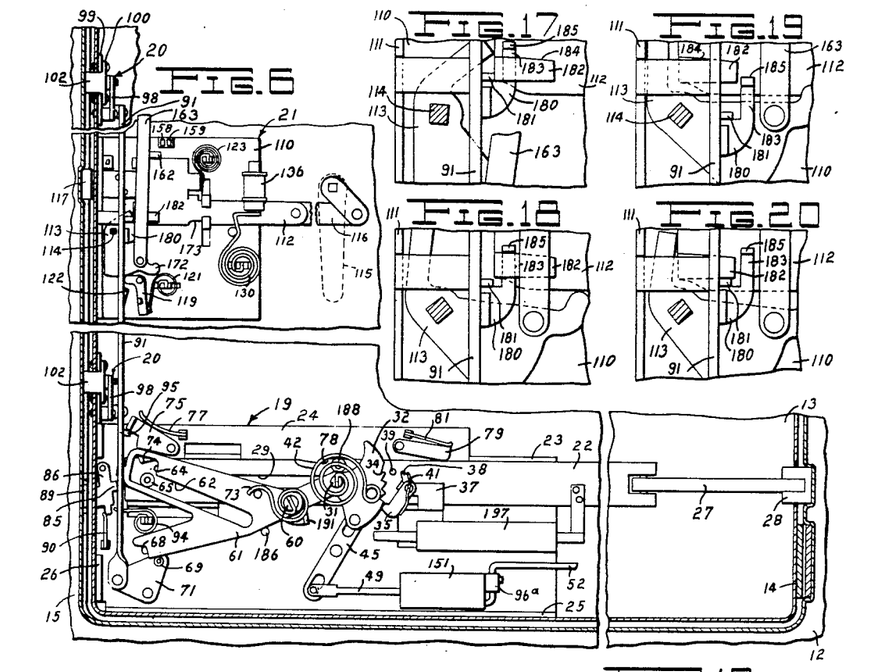
Fig. 6 is a fragmentary elevation, with parts in section, showing the latch bolt retracted and the door about to be opened.
Figs. 17, 18, 19 and 20 are fragmentary plan views showing the bolt control member in different positions.

The control member 91 is spaced slightly above the plate 110 and includes a portion 180 which has an outwardly directed tongue 181 (see Figs. 17 to 20) which is disposed in the path of a bent up tongue 182 on the latch member 112 so that when the parts are in the position shown in Fig. 17 the tongue 181 engages the tongue 182 to prevent movement of the latch member so that the latter is held retracted. As a result the latch bolt end 118 is concealed during the entire time the door is open so that any grease on the bolt end cannot soil the clothing or person of the passenger leaving or entering the vehicle.

As soon as the control member 91 has been shifted downwardly by the toggle the tongue 181 passes below the tongue 182 to the position shown in Fig. 18 so that latch member 112 is free to advance to engaged position. To prevent the control member 91 from shifting the bumper before the latch member is fully advanced the control member is provided with an upwardly extending portion 183 which passes over the latch member 112 and beneath the tongue 182. The tongue 182 has a curved upper edge 184 which is engaged by an outwardly directed tongue 185 on the portion 183.

It will thus be apparent that when the control member 91 is moved down by the rocker arm 71 through action of the toggle that the first movement will shift the control member thus causing the tongue 181 to be disengaged from the tongue 182 to release the latch member 112. The same movement brings the tongue 185 into engagement with the curved edge 184 on the tongue 182 and thus temporarily arrests further movement of the control member 91 until the tongue 182 on the latch member clears the tongue 185, whereupon the control member is free to move downwardly to the position shown in Fig. 19. The tongue 185 arrests movement of the toggle when the leverage is slight so that there is no undue amount of binding between the tongues. After the dog 119 is released the tongues 181, 182 and 185 assume the position shown in Fig. 20.

Figure 9:
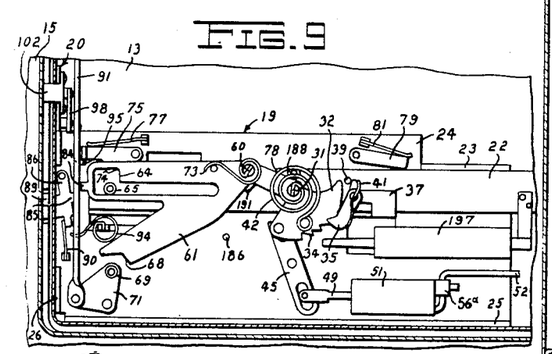
Fig. 9 is an elevation with parts in section showing the control member after being energized by the vacuum cylinder.

The operation of the device is as follows: assuming that the passenger has entered the vehicle and has settled himself comfortably. He then gently pulls the door towards closed position. With the spring 42 energized and with the latch member 112 approaching its cooperating strike and (if desired) with the parts so constructed that the door is in a position where the fingers can not be disposed between door and frame a slight movement of the door towards closed position causes the pin 39 to release the dog 35 thus allowing the lever 32 to rock about its pivot 31 (as shown in Fig. 9) thus shifting the second lever 61 about the axis of the roller 65 and thus advancing the roller 65 and consequently advancing the traction member 22 to move the door towards more fully closed position so that the latch bolt end 118 rides over its strike and engages. The resultant action between levers 32 and 61 constitutes a toggle effect with the power increasing as the toggle straightens thus forcing the door to latched position.

In the construction shown wherein the cam arm 86 is included the end 84 of the lever 61 rocks the arm 86 so that the cam surface 88 acts on the strike 89 at the edge of the door remote from the hinge to move the door closed while at the same time the traction member is acting at the hinge side of the door to pull the door closed. The movement described continues until the first toggle is straightened.

During this act the roller 69 has become engaged with the shoulder 68 so that a second toggle effect is produced by the tendency of the spring 42 to further shift the lever 32. The double toggle action, as described, twice affords a maximum leverage, first to latch the door and then to tighten the bumpers so that the necessary force to perform the latching operation is provided by a single member which can be readily energized.

Continuing with the operation, the lever 61 rocks the arm 71 and in turn shifts the control member 91 downwardly causing the bumpers 20 to be moved into engagement with their associated pillar portions. At this time the dog 75 (if employed) is engaged as is the dog 119 pivoted to the latch plate 110. This dog 119 engages the control member 91 to hold the latter with the bumpers engaged.

At this position the lever 61 engages a pin 186 (see Fig. 5) on the plate 24 and thus when the pin 60 continues to move beyond the straightened position of the second toggle the lever 61 rocks about the pin 186 so that the outer end of the lever 61 is raised thus moving the roller 66 out of the path to the shoulder 64 and also freeing the roller 69 from the shoulder 68. The arrangement is such that the roller 66 is free to enter the slot 62 and the roller 69 is disposed below the shoulder 68.

The spring 90 normally urges the cam member 86 inwardly so that when the lever 61 is rocked about the pin 186 the end 84 of the lever 61 is raised above the portion 85 on the cam member 86 thus allowing the cam member to be withdrawn by its spring 90. The bumpers 20 remain in the tightly compressed and engaged position in which they have been placed and so tend to push the door open thus urging the latch bolt tightly against the strike.

From the foregoing it will be apparent that the bumpers are not under compression while the latch is being engaged so that there is no requirement for a sudden advance of the latch member before the bumpers react and as a result there is no requirement for a heavy spring. The door is usually opened by operation of the finger tip control with the spring 123 alone functioning and as a result the pressure required to close the door is slight and also the blow of the latch member is reduced with consequent sound decrease and as a result a latch is provided which enables the door to be closed without slamming and by which the door can be readily opened.

After the door has been latched the parts assume the normal closed position. If the vehicle is in rapid motion it is then necessary to turn one of the door handles 114 or 115 to withdraw the latch member so that the door may be opened. If the vehicle is moving slowly or is at rest, a finger tip pressure on one of the members 169 or 170 will release the door.

When the valve 55 is set to render the cylinder 51 inoperative to energize the spring 42, the opening of a door causes the roller 66 on the traction member 22 to move in the slot 62 while the upper portion of the lever 32 which constitutes a cam surface 187 is engaged by a roller 188 mounted on a pin 189 on the traction member. This roller 188 urges the toothed end of the lever 32 downwardly thus tensioning the spring 42. This action continues until the spring is completely energized whereupon the dog 35 engages the last tooth 34 on the end of the lever 32 and the parts assume the position shown in Fig. 7.

The spring energizing operation just described may occur while the door is being moved through approximately 30° although the angle may be varied. Further opening of the door causes the roller 188 to move over the rounded end 190 of the lever 32 so that as the door is swung to extremely wide position there is no further energizing of the spring and free movement occurs in both directions. When the door is being closed the roller 188 passes over the rounded end 190 mentioned and the traction member moves along the door until the pin 39 thereon shifts the dog 35 and releases the toggle member for action as previously described.

When the valve 55 is set to render the cylinder 51 operative to energize the spring 42 the piston 50 causes the spring cocking operation (which has been previously described) as soon as the action of the second toggle is completed. In the vacuum cocking operation a tongue 191 on the lever 32 engages the edge of the lever 61 and prevents the shoulder 64 from engaging the roller 66 as the door is opened so that the roller is free to run in the slot 62.

In some installations I may provide the traction member 22 with a dash pot construction to cushion the closing action. Such a construction may comprise a bracket 194 on the traction member on which a rod 195 is supported. The rod 195 includes a piston 196 working in a cylinder 197 which has an open end 198. The rod 195 extends beyond the piston as at 199 and passes through the aperture 200 in the end of the cylinder.

The portion 199 is preferably tapered. When the door closes the piston 196 moves in the cylinder and forces air through the aperture 200. As the door closing action nears completion the end 199 enters the aperture 200 thus causing air in the cylinder to be compressed to produce a cushioning effect.

Figure 22:
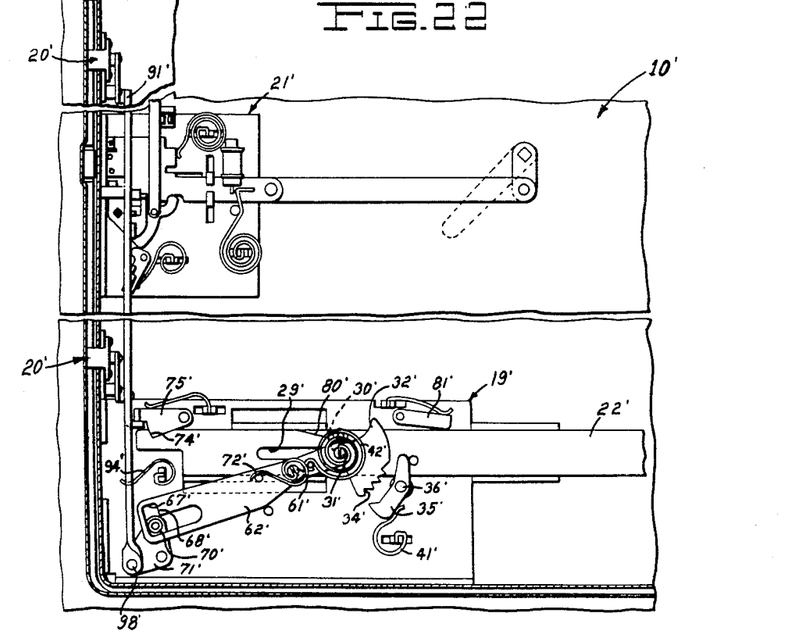
Fig. 22 is a fragmentary side elevation, partly in section, showing a modification and wherein the door is completely closed.
Figure 23:
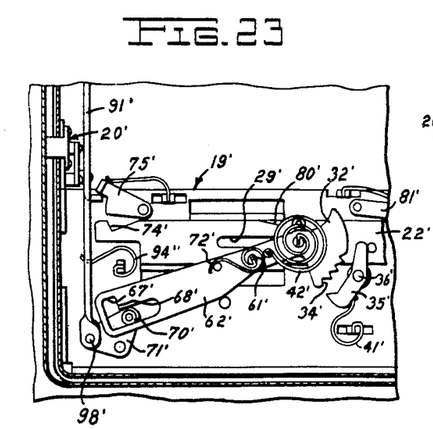
Fig. 23 is a fragmentary side elevation, partly in section, showing the position assumed when the bumper control member has been retracted.
Figure 24:
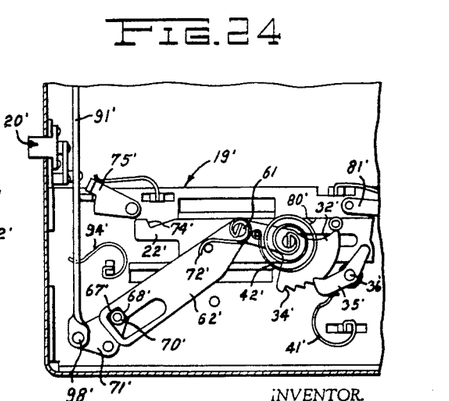
Fig. 24 is a fragmentary section, partly in elevation, showing the position assumed when the spring has just been energized and the door is being opened wider.

A modification of the invention is shown in Figs. 22, 23 and 24 wherein the door closing portion is omitted. The modified construction comprises a door control mechanism 10' which includes a control device 19', a bumper device 20' and a latch device 21'. The control device 19' is similar to the device 19 and includes a similar traction member 22' which is moved by a link (not shown) in a manner similar to the movement of the member 22 so that as the door moves the traction member slides thereon. The traction member includes a slot 29', roller 30' supported on a pin 31' which also pivotally supports a lever 32' similar to the lever 32 and which includes teeth 34' engageable by a dog 35'.

The dog 35' instead of consisting of two parts consists of a single member pivotally mounted on a pin 36' and urged to engaged position by a spring 41'.

The lever 32' is shifted by a spring 42' and at one end includes a pivot 61' which pivotally engages a second lever 62'. The lever 62' includes a slot 67' which has a shoulder 68' which is adapted to be engaged by a roller 70' mounted on a rocker arm 71'. A spring 72' shown as mounted on the pivot 61' urges the lever 62' downwardly. The traction member 22' includes a notch 74' engageable by a dog 75' and also includes a notch 80' engageable by a dog 81'.

A control member 91' extends along the inner face of the outer edge of the door and engages a pivot 98' on the rocker arm 71'. A spring 94' normally urges the control member upwardly. The bumper devices 20' are identical with those previously described and the control member 91' is connected to the bumper devices and operates them in the manner already set forth.

The latch device 21' is similar in all respects to the latch device previously described and operates in the same manner.

The operation of the modification with the exception that this is no door closing action is the same as that previously described.

Having thus described my invention I claim:

1. In a construction for automotive vehicles including a body member having a door opening and having a door member hinged at one side of the opening, a bumper on one of said members and engaging the other member to urge the door to open position, latch means to hold the door member closed, means under control of the speed of the vehicle to actuate the latch means to release the door member and means to release the pressure of the bumper on the other member prior to the movement of the latch means to door releasing position.

2. In a door construction for automotive vehicles including a frame member and a door member, a latch on one of the members adapted to be moved to engage the other member, means on one member shiftable to engage the other member to urge the door member open and thereby to tighten the latch against its engaged member, means to shift said shiftable means, means to prevent action of the shifting means and means to relieve the preventing means after the latch is moved to engaged position.

3. In a construction for motor vehicles including a body member having a door opening and having a door member hinged at one side of the opening, coacting means on the door member and body member to move the door member to a partially closed position and other means coacting with the first means and operable when the door member assumes the mentioned partially closed position to move said door member to a fully closed position.

4. In a construction for automotive vehicles including a body member having a door opening and having a door member hinged at one side of the opening, means to hold the door member closed, means to move said door member to closed position, means for urging said door member to open position and means coacting with said moving means to actuate said urging means.

5. In a construction for automotive vehicles including a body member having a door opening and having a door member hinged at one side of the opening, coacting means on said door member and body member to urge said door member from a partially closed to a closed position, means to energize said urging means, means normally preventing actuation of the urging means and means to release said urging means when the door member reaches a partly closed position.

6. In a construction for automotive vehicles including a body member having a door opening and having a door member hinged at one side of the opening, coacting means on the door and body members operable to move said door member to a closed position and manually releasable, speed controlled, catch means coacting with said moving means to hold said door member closed.

7. In a construction for automotive vehicles including a body member having a door opening and having a door member hinged at one side of the opening, coacting means on the door and body members to move said door member from a partly closed to a closed position, means operable by swinging of the door member to cock said moving means, means enabling said door member to swing freely after the moving means is cocked and means operable when the door member reaches a partly closed position to cause said moving means to act.

8. In a construction for automotive vehicles including a body member having a door opening and having a door member hinged at one side of the opening, means coacting on the door and body members to hold the door member against opening from a partially closed position, means operable when the door member assumes the mentioned partially closed position to move said door member to a fully closed position and means actuated by movement of the door member to energize the moving means.

9. In a construction for automotive vehicles including a body member having a door opening and having a door member hinged at one side of the opening, means on said door member engaging means on said body member to urge said door member from a partially closed to a closed position, means to energize said urging means, means normally preventing actuation of the urging means, means enabling the door member to swing unimpeded after the urging means is energized and means to cause said urging means to act when the door member reaches a partly closed position.

10. In a construction for automotive vehicles including a body member having a door opening and having a door member hinged at one side of the opening, bumper means on one member engaging the other member, operating means to cause relative movement between one of the members and the bumper means to compress the bumper means and means operable by the movement of the door member to energize the operating means.

11. In a construction for motor vehicles including a body having a door opening and having a door hinged at one side of the opening, means on said door engaging means on said body to move said door to a partially closed position, other moving means to move the door from the partly closed position to a fully closed position, means to energize said moving means, means normally preventing actuation of the moving means, means enabling the door to swing unimpeded after the moving means is energized and means to cause said moving means to act.

12. In a construction for automotive vehicles including a body member having a door opening and having a door member hinged at one side of the opening, a bumper movable on one of said members and engaging the other member to urge the door member to open position, means to actuate the bumper to engaged position and latch means to hold the bumper in engaged position.

13. In a construction for automotive vehicles including a body member having a door opening and having a door member hinged at one side of the opening, bumper means movably mounted on one of said members to engage the other member, means to urge said bumper means against the other member and means to cause the urging means to act when the door member reaches a closed position.

14. In a construction for automotive vehicles including a body member having a door opening and having a door member hinged at one side of the opening, a latch for the door member, spaced bumpers movable on one of the members to urge the door member to open position and to thereby increase the pressure on the latch, a toggle member, means to straighten the toggle member, and means whereby said toggle member moves said bumpers.

15. In a construction for automotive vehicles including a body member having a door opening and having a door member hinged at one side of the opening, coacting means on the door and body members operable to move said door member to a closed position and handle releasable means coacting with said moving means to hold said door member closed, a bumper movable on the door member to engage the body member and means whereby said moving means moves said bumper.

16. In a construction for automotive vehicles including a body member having a door opening and having a door member hinged at one side of the opening, coacting means on the door and body members to move said door member to a latched position, means to render said moving means active, means to cause said moving means to act, a cam bolt on the door member movable to engage the body member and means coacting with the moving means to move the cam bolt.

17. In an automotive vehicle construction, a frame member, a door member, a bolt slidable on one member to advance position to engage the other member to hold the door closed, a bumper movable on one member to engage the other member, means to shift the bumper and means to prevent actuation of the shifting means until the bolt has moved to advanced position.

18. In a construction for automotive vehicles including a body member having a door opening and having a door member hinged at one side of the opening, a traction member pivotally engaging the body member and extending into the door member, a lever pivotally connected to the door member, means urging the lever in one direction, a second lever pivoted on said first lever at one end thereof, said second lever having a pivotal connection at the other end with the traction member, said connection affording a toggle action whereby when the lever is moved the door member is moved to closed position, a dash pot to control the movement of the levers, a pair of bumpers pivoted on the door member, operating means for shifting the bumpers, means on said operating means pivotally engaging the second lever to afford a second toggle action after the first toggle action is completed, handle released catch means engaging said traction member to hold the door member closed and other handle released catch means engaging said bumper operating means.

19. In a control device for motor vehicle doors, a bumper, means to shift the bumper, means to energize the shifting means, means normally preventing actuation of the shifting means and means to release the shifting means when the door reaches a partly closed position.

20. In a construction for automotive vehicles including a body member having a door opening and having a door member hinged at one side of the opening, means operable to move the door member to a closed position, means operated by door movement to energize the moving means, latch means to hold the door member after it has moved to closed position and speed controlled, manually operated means to release the latch means.

21. In a construction for automotive vehicles including a body member having a door opening and having a door member hinged at one side of the opening, said door member having a latch adapted to engage the body member, means to urge the door member to latched position, means to energize said urging means, means normally preventing actuation of the urging means, and means operable by door movement to release the urging means.

22. In a vehicle door latch construction, a bolt, a bumper movable to urge the bolt into engagement with a strike, means to move the bolt to engaged position, means operable after the bolt is engaged to tighten the bumper and thereby increase the pressure of the bolt against the strike and speed controlled means to release the bolt.

23. In a motor vehicle door latch construction, a bolt, handle operated means to release the bolt, a bumper, means adapted to urge the bolt into tightly engaged position, and means to decrease the pressure of the bumper prior to the release of the bolt by the handle operated means.

24. In an automotive vehicle door latch construction, means adapted to coact with a door frame at the hinged side of a door to move the door to partly closed position, and means at the free side of the door and independent of the first means and adapted to coact with the door frame to move the door from the partly closed position to a fully closed position.

25. In a vehicle door latch, means to move the door to closed position, a bolt, means to move the bolt to engaged position, means to tighten the bolt pressure after it is in engaged position, and means coacting with the door moving means to actuate the tightening means.

BURNIE J. CRAIG.